US012487562B2

(12) United States Patent
Lee et al.

(10) Patent No.: US 12,487,562 B2
(45) Date of Patent: Dec. 2, 2025

(54) WEARABLE ELECTRONIC DEVICE INCLUDING WHEEL

(71) Applicant: Samsung Electronics Co., Ltd., Suwon-si (KR)

(72) Inventors: Kyunghwan Lee, Suwon-si (KR); Kwangsoo Han, Suwon-si (KR); Sangrok Oh, Suwon-si (KR); Yonglim Lee, Suwon-si (KR); Jaejin Lee, Suwon-si (KR); Wookdam Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 18/360,379

(22) Filed: Jul. 27, 2023

(65) Prior Publication Data

US 2024/0019812 A1 Jan. 18, 2024

Related U.S. Application Data

(63) Continuation of application No. PCT/KR2022/005331, filed on Apr. 13, 2022.

(30) Foreign Application Priority Data

Apr. 14, 2021 (KR) ........................ 10-2021-0048815

(51) Int. Cl.

| | |
|---|---|
| ***G04B 19/28*** | (2006.01) |
| ***G04G 21/00*** | (2010.01) |
| ***G04G 99/00*** | (2010.01) |

(52) U.S. Cl.

CPC ........... *G04B 19/283* (2013.01); *G04G 21/00* (2013.01); *G04G 99/006* (2013.01)

(58) Field of Classification Search

CPC .... G04B 19/283; G04G 21/00; G04G 99/006; G04G 17/02; G04G 17/04; G04G 17/08; G04G 99/00; G06F 3/0362

See application file for complete search history.

(56) References Cited

U.S. PATENT DOCUMENTS 7,182,508 B2 2/2007 Bertrand et al.
9,829,917 B2 11/2017 Lee (Continued)

FOREIGN PATENT DOCUMENTS

JP H0684383 U 12/1994
JP 2017078626 A 4/2017

(Continued)

OTHER PUBLICATIONS

International Search Report for PCT/KR2022/005331 mailed Jul. 28, 2022, 4 pages.

(Continued)

*Primary Examiner* — Edwin A. Leon
(74) *Attorney, Agent, or Firm* — Nixon & Vanderhye, P.C.

(57) ABSTRACT

An example wearable electronic device may include a main body including a first surface having an opening area formed therein, wherein a plurality of lateral walls, surrounding at least one part of the opening area, are formed in the peripheral area of the opening area; a display disposed inside the main body and which is viewable through the opening area; a wheel including a mounted part, which is at least partially mounted on the peripheral area, and an extension part which extends in the inward direction from the mounted part, wherein the wheel is formed in a ring shape extending in the circumferential direction with respect to a rotation axis of the wheel; and a guide member partially coming into contact with the main body and the wheel, respectively, and for guiding the rotation of the wheel. The guide member may (Continued)

include a first part having at least one portion thereof extending to a space between the plurality of lateral walls and a second part at least partially inserted to a first recess formed in each of the plurality of lateral walls.

20 Claims, 11 Drawing Sheets

(56) References Cited

U.S. PATENT DOCUMENTS

| | | | | |
|---|---|---|---|---|
| 10,001,751 | B2 * | 6/2018 | Jung | G04G 21/00 |
| 11,126,142 | B2 | 9/2021 | Wahler et al. | |
| 11,314,207 | B2 * | 4/2022 | Silvant | G04B 19/283 |
| 11,388,825 | B2 | 7/2022 | Lee | |
| 11,449,008 | B2 * | 9/2022 | Gauche | G04B 37/05 |
| 11,774,912 | B2 * | 10/2023 | Allimann | G04B 37/0033 368/309 |
| 12,253,829 | B2 * | 3/2025 | Allimann | G04B 37/0008 |
| 12,306,586 | B2 * | 5/2025 | Allimann | G04B 37/0033 |
| 12,353,172 | B2 * | 7/2025 | Allimann | G04B 37/0008 |
| 2005/0007890 | A1 | 1/2005 | Bertrand et al. | |
| 2017/0048994 | A1 | 2/2017 | Lee | |
| 2017/0277125 | A1 | 9/2017 | Jung et al. | |
| 2019/0187619 | A1 | 6/2019 | Wahler et al. | |
| 2019/0294115 | A1 | 9/2019 | Silvant | |
| 2021/0007233 | A1 | 1/2021 | Lee | |

FOREIGN PATENT DOCUMENTS

| | | | |
|---|---|---|---|
| JP | 2019164131 | A | 9/2019 |
| KR | 20150081169 | A | 7/2015 |
| KR | 20170111096 | A | 10/2017 |
| KR | 20170132693 | A | 12/2017 |
| KR | 20180083685 | A | 7/2018 |
| KR | 20190074985 | A | 6/2019 |
| KR | 20190100808 | A | 8/2019 |
| KR | 102206457 | B1 | 1/2021 |

OTHER PUBLICATIONS

Written Opinion of the ISA for PCT/KR2022/005331 mailed Jul. 28, 2022, 3 pages.

* cited by examiner

WEARABLE ELECTRONIC DEVICE INCLUDING WHEEL

CROSS-REFERENCE TO RELATED APPLICATIONS

This application is a continuation application of International Application No. PCT/KR2022/005331 designating the United States, filed on Apr. 13, 2022, in the Korean Intellectual Property Receiving Office and claiming priority to Korean Patent Application No. 10-2021-0048815, filed on Apr. 14, 2021, in the Korean Intellectual Property Office, the disclosures of each of which are incorporated by reference herein in their entireties.

BACKGROUND

Field

The disclosure relates to a wearable electronic device including a wheel.

Description of Related Art

As portable devices, such as smartphones, have been generally used, wearable electronic devices (for example, smartwatches) used in conjunction with smartphones also have been increasingly distributed. The wearable electronic devices are connected to smartphones through wired or wireless communication to provide various functions or operations provided by the smartphones to users. Due to their conveniences, in recent years, a distribution speed of wearable electronic devices, such as smartwatches, has been gradually increasing.

Wearable electronic watches may be mounted on wrists of users. The wearable electronic watches may include a main body, and a wheel coupled to the main body to be rotatable. The wheel and the main body may be coupled to each other through a rotational guide member. The wheel may function as a user input. For example, the user may adjust a rotation angle or a direction of the wheel to perform a function of the wearable electronic device.

SUMMARY

A wearable electronic device including a rotating wheel may include a space for smooth movement of the wheel, and a contact area for supporting the wheel. When the space between a guide member and the wheel becomes larger, it can be difficult to stably support the wheel because the wheel is not fixed at a specific location when an external impact is applied. When a contact area between the guide member and the wheel increases, frictional forces also increase, causing wearing, and thus it may be difficult to support a horizontal state of the wheel. Furthermore, in an assembling process, the guide member may be moved due to the empty space.

According to an example embodiment of the disclosure, a wearable electronic device includes a main body including a first surface having an opening area, wherein a plurality of side walls surrounding at least a portion of the opening area are formed in a peripheral area of the opening area, a display disposed in an interior of the main body for viewing through the opening area, a wheel including a seating part at least partially seated in the peripheral area, and an extending part extending from the seating part in an inward direction, wherein the wheel is formed in a ring shape extending in a circumferential direction defined with respect to a rotation axis of the wheel, and a guide member at least partially contacting the main body and the wheel and that guides rotation of the wheel, the guide member includes a first part, at least a portion of which extends in spaces between the plurality of side walls, and a second part at least partially inserted into first recesses formed in the plurality of side walls.

According to an example embodiment the disclosure, a wearable electronic device includes a main body including an opening area, and a first surface, on which a first side wall and a second side wall surrounding at least a portion of the opening area are formed, a wheel rotatable about a rotation axis, wherein the wheel includes a seating part located on a radially outer side of the side wall and at least partially disposed on the first surface of the main body, and an extending part extending from the seating part on the radially outer side, and a guide member including a first part, at least a portion of which is located in a space between the first side wall and the second side wall, and a second part located between each of the first side wall and the second side wall, and the seating part of the wheel when viewed in a radial direction, the first part of the guide member includes a first boss protruding in the direction of the rotation axis to at least partially contact the extending part, and the second part of the guide member includes a second boss protruding in the radial direction to at least partially contact the seating part of the wheel.

According to the example embodiments disclosed in the disclosure, in a process of assembling the wheel and the guide member, an assembly deviation may be reduced through inward movement of the wheel, a shape of which does not need to be deformed. Furthermore, the guide member includes a support part in the direction of the rotation axis and a support part in the radial direction whereby the parts may be tuned or wearing in the parts may be separately managed.

Various effects recognized directly or indirectly through the specification may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to a description of the drawings, the same or similar reference numerals may be used for the same or similar components.

DETAILED DESCRIPTION

Hereinafter, various example embodiments of the disclosure will be described with reference to the accompanying drawings. However, it should be understood that the disclosure is not intended to limit specific embodied forms and is intended to include various modifications, equivalents, and/or alternatives of the embodiments of the disclosure.

Figure 1:
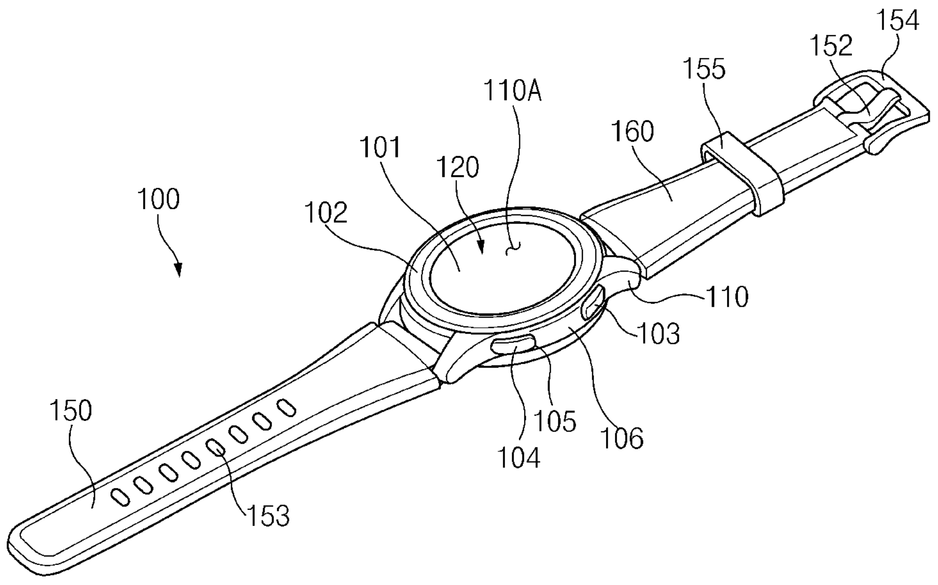
FIG. 1 is a perspective view of a front surface of an example mobile electronic device according to various embodiments.
Figure 2:
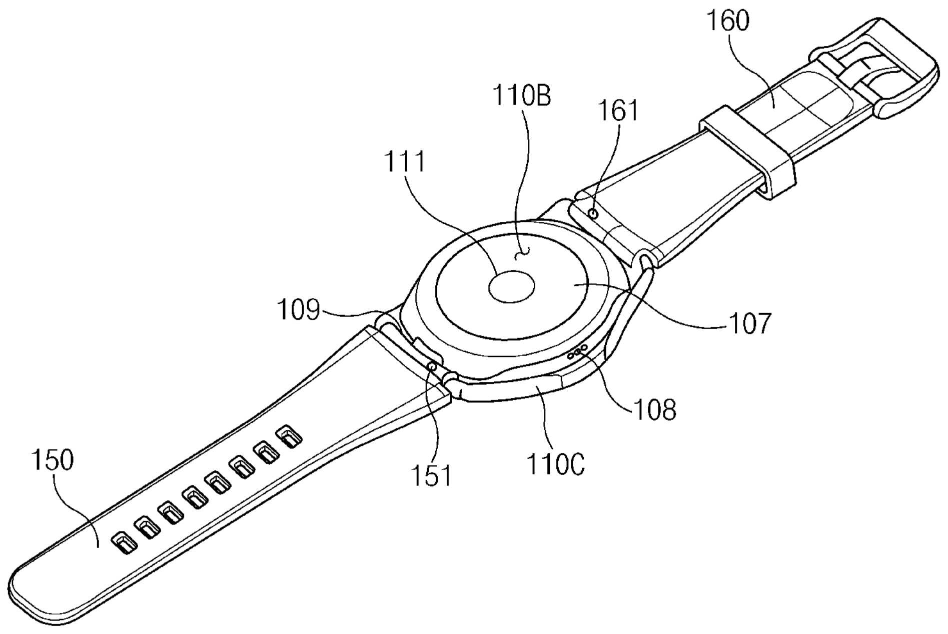
FIG. 2 is a perspective view of a rear surface of the example electronic device according to various embodiments.

FIG. 1 is a perspective view of a front surface of an example mobile electronic device according to various embodiments. FIG. 2 is a perspective view of a rear surface of the example electronic device according to various embodiments.

Referring to FIGS. 1 and 2, an electronic device 100 according to an embodiment may include a housing 110 including a first surface (or a front surface) 110A, a second surface (or a rear surface) 110B, and a side surface 110C that surrounds a space between the first surface 110A and the second surface 110B, and fastening members 150 and 160 that are connected to at least the housing 110 and configured to fasten the electronic device 100 to a portion (e.g., a wrist or an ankle) of the body of a user. In an embodiment (not illustrated), the housing may refer to a structure that defines some of the first surface 110A, the second surface 110B, and the side surface 110C of FIG. 1. According to an embodiment, at least a portion of the first surface 110A may be defined by a substantially transparent front plate 101 (e.g., a glass plate including various coating layers or a polymer plate). The second surface 110B may be defined by a substantially opaque rear plate 107. The rear plate 107, for example, may be formed of coated or colored glass, ceramics, a polymer, a metal (e.g., aluminum, stainless steel (STS), or magnesium), or a combination of at least two thereof. The side surface 110C may be defined by a side bezel structure (or a "side member") 106 that is coupled to the front plate 101 and the rear plate 107 and includes a metal and/or a polymer. In various embodiments, the rear plate 107 and the side bezel structure 106 may be integrally formed and include the same material (e.g., a metallic material such as aluminum). The fastening members 150 and 160 may be formed of various materials and in various shapes. A plurality of integral unit links may be formed of fabrics, leather, rubber, urethane, a metal, or ceramics, or a combination of at least two thereof to be moved with respect to each other.

According to an embodiment, the electronic device 100 may include at least one of a display 120 (see FIG. 3), audio modules 105 and 108, a sensor module 111, key input devices 102, 103, and 104, and a connector hole 109. In various embodiments, the electronic device 100 may exclude at least one (e.g., the key input devices 102, 103, and 104, the connector hole 109, or the sensor module 111) of the components, or may additionally include another component(s).

The display 120, for example, may be exposed through a corresponding part of the front plate 101. A shape of the display 120 may be a shape corresponding to a shape of the front plate 101, and may be various shapes, such as a circular shape, an elliptical shape, or a polygonal shape. The display 120 may be coupled to or disposed adjacent to a touch detecting circuit, a pressure sensor that may measure an intensity (pressure) of a touch, and/or a fingerprint sensor.

The audio modules 105 and 108 may include the microphone hole 105 and the speaker hole 108. A microphone for acquiring an external sound may be disposed in the microphone hole 105, and in various embodiments, a plurality of microphones may be disposed to detect a direction of the sound. The speaker hole 108 may be used as an external receiver or a communication receiver. In various embodiments, the speaker hole 108 and the microphone hole 105 may be implemented by one hole, or a speaker may be provided with no speaker hole (e.g., a piezo speaker).

The sensor module 111 may generate an electric signal or a data value corresponding to an operational state of an interior of the electronic device 100 or an external environment state. The sensor module 111, for example, may include a biometric sensor module (e.g., heart rate monitor (HRM) sensor) that is disposed on the second surface 110B of the housing 110. The electronic device 100 may further include a sensor module (not illustrated) including, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination intensity sensor.

The key input devices 102, 103, and 104 may include a wheel key 102 that is disposed on the first surface 110A of the housing 110 and may be rotated in at least one direction, and key buttons 102 and 103 that are disposed on the side surface 110C of the housing 110. The wheel key may have a shape corresponding to a shape of the front plate 102. In an embodiment, the electronic device 100 may not include some or all of the mentioned key input devices 102, 103, and 104, and the key input devices 102, 103, and 104 that are not included may be implemented in another form, such as a soft key, on the display 120.

The connector hole 109 may accommodate a connector (for example, a USB connector) for transmitting and receiving power and/or data to and from an external electronic device. Another connector hole (not illustrated) that may accommodate a connector for transmitting and receiving an audio signal to and from an external electronic device may be provided. The electronic device 100, for example, may further include a connector cover (not illustrated) that covers at least a portion of the connector hole 109 and prevents (or reduces) introduction of external foreign substances into the connector hole.

The fastening members 150 and 160 may be fastened to be attached to and detached from at least a partial area of the housing 110 using locking members 151 and 161. The fastening members 150 and 160 may include one or more of a fixing member 152, a fixing member coupling hole 153, a band guide member 154, and a band fixing ring 155.

The fixing member 152 may be configured to fix the housing 110 and the fastening members 150 and 160 to a portion (e.g., a wrist or an ankle) of the body of the user. The fixing member coupling hole 153 may fix the housing 110 and the fastening members 150 and 160 to a portion of the body of the user in correspondence to the fixing member 152. The band guide member 154 may cause the fastening members 150 and 160 to be adhered and fastened to a portion of the body of the user by restricting a motion range of the fixing member 152 when the fixing member 152 is coupled to the fixing member coupling hole 153. The band fixing ring 155 may restrict the motion ranges of the fastening members 150 and 160 while the fixing member 152 and the fixing member coupling hole 153 are coupled to each other.

Figure 3:
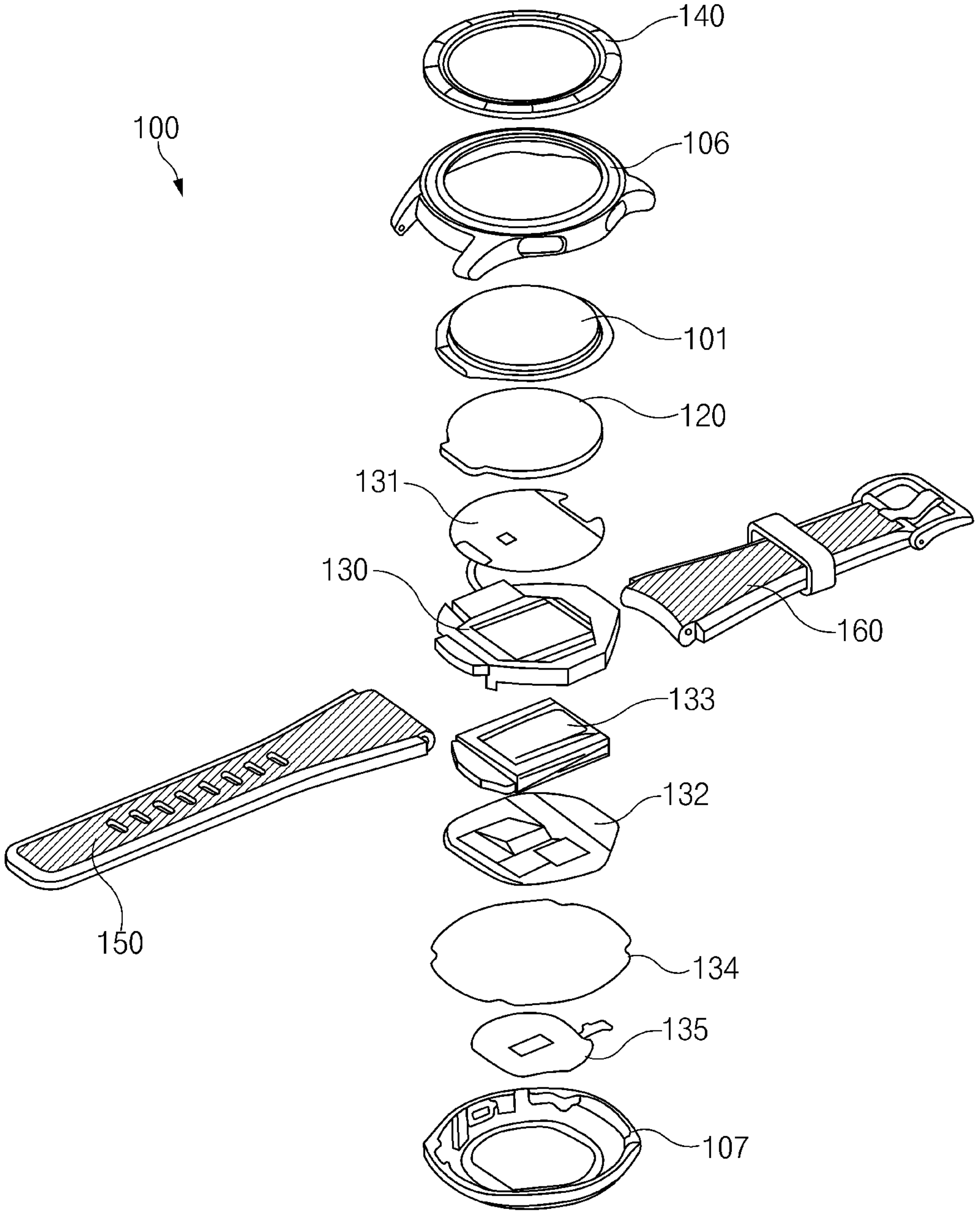
FIG. 3 is an exploded perspective view of the example electronic device according to various embodiments.

FIG. 3 is an exploded perspective view of the example electronic device according to various embodiments.

Referring to FIG. 3, the electronic device 100 may include the side bezel structure 106, the wheel key 140, the front plate 101, the display 120, a first antenna 131, a second antenna 135, a support member 130 (e.g., a bracket), a battery 133, a printed circuit board 132, a sealing member 134, the rear plate 107, and the fastening members 150 and 160.

The support member 130 may be disposed in an interior of the electronic device 100 to be connected to the side bezel structure 106, or may be integrally formed with the side bezel structure 106. The support member 130, for example, may be formed of a metallic material and/or a nonmetallic material (e.g., a polymer). The display 120 may be coupled to one surface of the support member 130 and the printed circuit board 132 may be coupled to an opposite surface thereof. A processor, a memory, and/or an interface may be mounted on the printed circuit board 132. The processor, for example, may include one or more of a central processing unit, an application processor, a graphic processing unit (GPU), an application processor, a sensor processor, or a communication processor.

The memory, for example, may include a volatile memory or a nonvolatile memory. The interface, for example, may include a high definition multimedia interface (HDMI), a universal serial bus (USB) interface, an SD card interface, and/or an audio interface. The interface, for example, may electrically or physically connect the electronic device 100 to an external electronic device, and may include a USB connector, an SD card/MMC connector, or an audio connector The battery 133 is a device for supplying electric power to at least one component of the electronic device 100, and may include a primary battery that cannot be recharged, a secondary battery that may be recharged, or a fuel battery. At least a portion of the battery 133, for example, may be disposed on substantially the same plane as the printed circuit board 132. The battery 133 may be integrally disposed in an interior of the electronic device 100, and may be disposed to be attached to or detached from the electronic device 100.

The first antenna 131 may be disposed between the display 120 and the support member 130. The first antenna 131, for example, may include a near field communication (NFC) antenna, a wireless charging antenna, and/or a magnetic secure transmission (MST) antenna. The first antenna 131, for example, may perform near field communication with an external device, may wirelessly transmit and receive electric power that is necessary for charging, or may transmit a magnetic-based signal including a near field communication signal or payment data. In an embodiment, an antenna structure may be defined by the side bezel structure 106 and/or a portion of the support member 130, or a combination thereof.

The second antenna 135 may be disposed between the circuit board 132 and the rear plate 107. The second antenna 135, for example, may include a near field communication (NFC) antenna, a wireless charging antenna, and/or a magnetic secure transmission (MST) antenna. The second antenna 135, for example, may perform near field communication with an external device or wirelessly transmit and receive electric power that is necessary for charging, and may transmit a magnetic-based signal including a near communication signal or payment data. In an embodiment, an antenna structure may be defined by the side bezel structure 106 and/or a portion of the rear plate 107, or a combination thereof.

The sealing member 134 may be located between the side bezel structure 106 and the rear plate 107. The sealing member 134 may be configured to interrupt moisture and foreign substances that are introduced into the space between the side bezel structure 106 and the rear plate 107 from outside.

Figure 4:
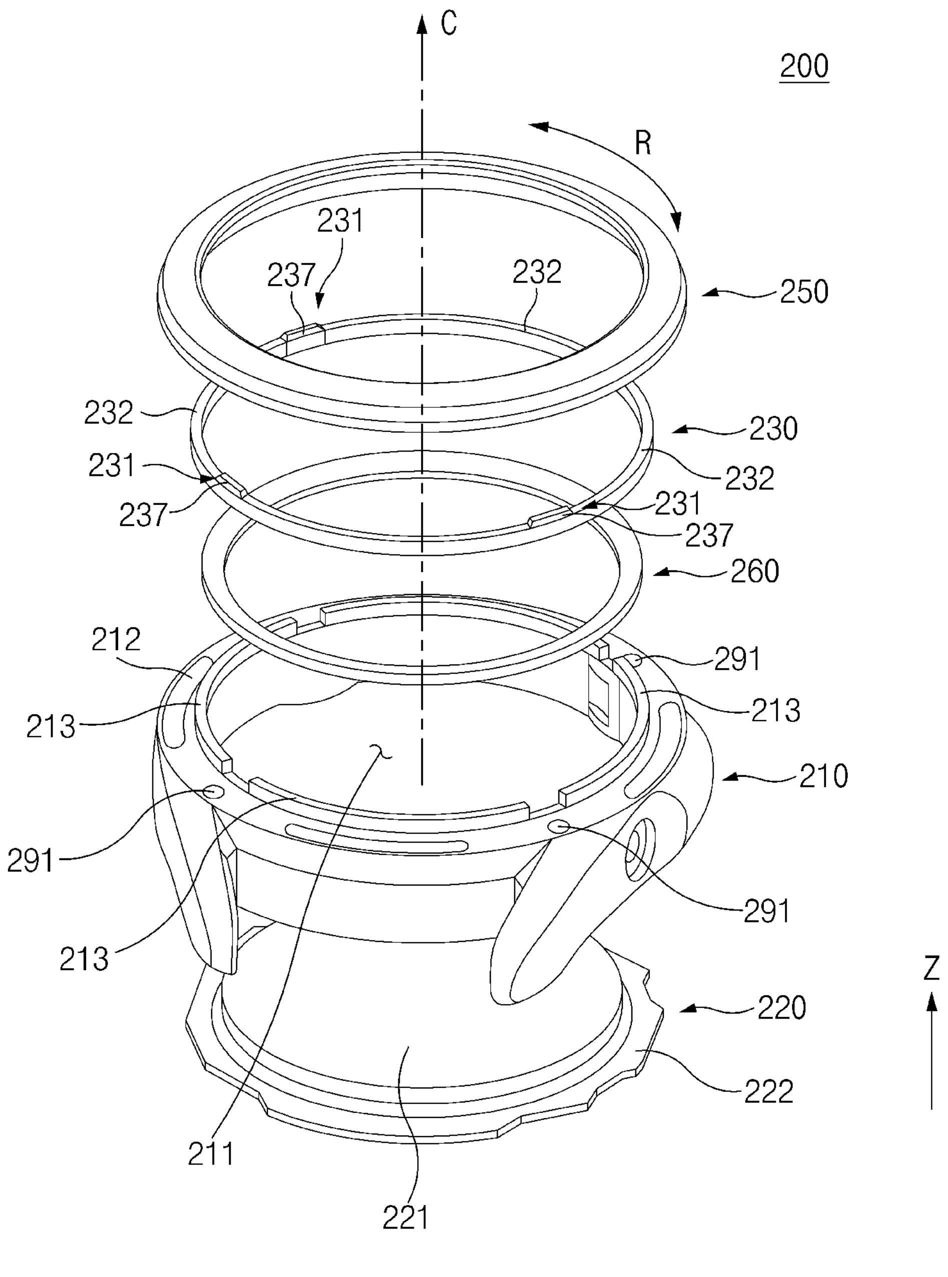
FIG. 4 is an exploded perspective view of the example electronic device according to various embodiments.

FIG. 4 is an exploded perspective view of an example electronic device according to various embodiments.

Figure 5:
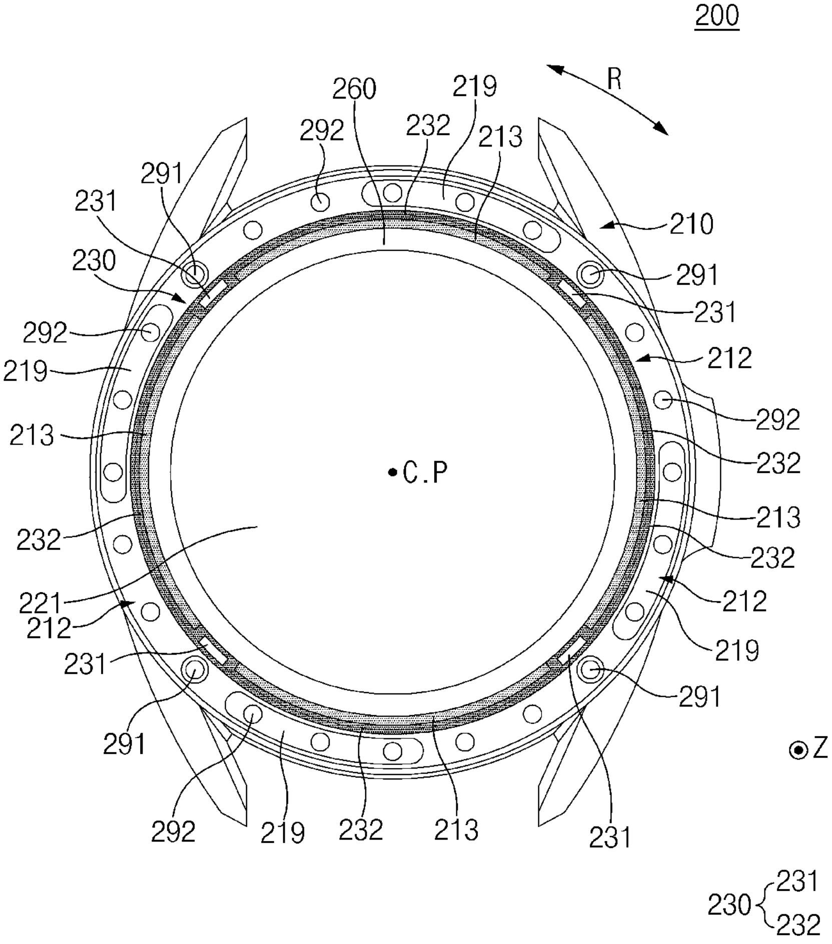
FIG. 5 is a plan view of the example electronic device according to various embodiments.

FIG. 5 is a plan view of an example electronic device according to various embodiments.

Referring to FIG. 4, an electronic device 200 may include a main body 210, a front plate 220, an inner ring 260, a guide member 230, and a wheel 250.

Hereinafter, in a description of the electronic device, a rotation axis "C" of a wheel, a radial direction of the rotation axis "C", and a circumferential direction "R" that is a clockwise direction or a counterclockwise direction about the rotation axis "C" may be defined. The inner radial direction (e.g., an inward direction) may be defined, for example, by a direction that becomes closer to the rotation axis "C", and an outward radial direction (e.g., an outward direction) may be defined, for example, as a direction that becomes farther from the rotation axis "C". An extension direction and a radial direction of the rotation axis "C" may be perpendicular to each other.

In an embodiment, the main body 210 may be formed in a shape that surrounds an interior space. The main body 210 may define a side surface of the electronic device. A printed circuit board (e.g., the printed circuit board 132 of FIG. 3), a battery (e.g., the battery 133 of FIG. 3), and a display (e.g., the display 120 of FIG. 3) may be disposed in the interior space.

In an embodiment, an opening area 211 may be formed on a first surface (e.g., a surface that faces the z axis direction) of the main body 210, and a side wall 213 may be formed along at least a portion of a periphery of the opening area 211 in a peripheral area of the opening area 211. For example, the opening area 211 may have a circular shape. However, the opening area 211 does not necessarily need to have a circular shape, and the opening area 211 may have various shapes.

In an embodiment, the side wall 213 may include a plurality of side walls that protrudes in the z axis direction. The plurality of side walls 213 may extend by a specific length along a periphery of the opening area 211. Any one of the plurality of side walls 213 may be spaced apart from another side wall 213 that is adjacent thereto, by a specific interval. A first area 221 of the front plate 220 may be located in the opening area 211. For example, the plurality of side walls 213 may be formed in a shape that surrounds a periphery of the first area 221 of the front plate 220.

In an embodiment, at least a portion of the front plate 220 may be disposed in an interior space of the main body 210. The front plate 220 may include the first area 221 that is located in the opening area 211 and a second area 222 that is a peripheral area of the first area 221, when viewed in the z axis direction. The first area 221 may include an area that protrudes further in the z axis direction than the second area 222. For example, at least a portion of a periphery of the first area 221 may be surrounded by the plurality of side walls 213. When the electronic device 200 is viewed in the z axis direction, the first area 221 may be exposed to a front surface of the electronic device 200, and the second area 222 may be covered by the first surface (e.g., a peripheral area 212) of the main body 210. The first area 221 of the front plate 220 may be formed to be transparent such that the display (e.g., the display 120 of FIG. 2) is viewable.

In an embodiment, the inner ring 260 may be disposed in an interior of the opening area 211. The inner ring 260 may be formed to surround at least a portion of the first area 221 of the front plate 220. The inner ring 260 may be disposed in an inward direction of the side wall 213 of the main body 210. For example, an inner side of the inner ring 260 may at least partially contact the side wall 213 of the main body 210. When viewed in the z axis direction, the inner ring 260 may include an index (e.g., a clock scale) including a plurality of markers that are marked at a specific interval along a circumferential direction thereof.

In an embodiment, the guide member 230 may be disposed in an outward direction of the inner ring 260. The guide member 230 may have a ring shape that surrounds the inner ring 260 and the first area 221 of the front plate 220. The guide member 230 may be disposed in the peripheral area 212 of the main body 210. The guide member 230 may include a first part 231 that extends to a space between the side walls 213, and a second part 232 that is located in an outward direction of the side wall 213. For example, the first part 231 may include a part that extends further in an inward direction than the second part 232. Referring to FIG. 4, a first boss 237 that protrudes in the +z axis direction may be formed in the first part 231. In an embodiment, the guide member 230 may be configured to guide rotation of the wheel 250. For example, the guide member 230 may be configured to support the wheel 250 in the z axis direction (e.g., a direction of the rotation axis "C") and a direction (for example, a radially inward direction and a radially outward direction) that is perpendicular to the z axis direction.

In an embodiment, the wheel 250 may be coupled to the main body 210 to be rotatable. The wheel 250 may be disposed to cover the peripheral area 212 of the main body 210, and the guide member 230 when viewed in the z axis direction. When the electronic device 200 is viewed in the z axis direction, the wheel 250 may be viewed as the front surface of the electronic device 200, together with the inner ring 260 and the first area 221 of the front plate 220.

In various embodiments, the electronic device 200 may include a detent structure for stopping rotation of the wheel 250 and a bearing structure 291 for providing a rolling frictional force to the wheel 250.

For example, the detent structure may include a recess 292 that is formed in the peripheral area 212 of the main body 210 and a protrusion (not illustrated) that is formed in the wheel 250. At least a portion of the protrusion of the wheel 250 may be accommodated in the recess 292. For example, the protrusion may protrude in the −z axis direction, and the recess 292 may be recessed in the −z axis direction. For example, the rotation of the wheel 250 may be stopped as the protrusion of the wheel 250 is inserted into the recess 292 of the main body 210.

In an embodiment, the detent structure may include the recess 292 that is recessed in the wheel 250 in the +z axis direction, and the protrusion (not illustrated) that protrudes from the main body 210 in the +z axis direction.

For example, the bearing structure 291 may include a ball that is at least partially accommodated in the hole formed in the peripheral area. The ball may roll while being inserted into the hole when the wheel is rotated. The ball may provide a rolling frictional force to the wheel. In various embodiments, referring to FIG. 4, the bearing structure 291 may be formed at a location that is adjacent to the first part 231 of the guide member 230. However, the location of the bearing structure 291 is not limited to the illustration of the drawings, and for example, the bearing structure 291 may be formed at a location that is adjacent to the second part 232 of the guide member 230.

Referring to FIG. 5, the electronic device 200 may include an impact absorbing member 219 that is formed in the peripheral area 212 of the main body 210. For example, the impact absorbing member 219 may be configured to absorb an impact applied to the electronic device 200 and/or reduce vibrations. In various embodiments, the impact absorbing member 219 may be configured to prevent foreign substances located between the wheel 250 and the main body 210 from being introduced into an interior space (e.g., the interior space of the housing 110 of FIG. 1) of the electronic device 200. For example, the impact absorbing member 219 may include a Teflon material. For example, the impact absorbing member 219 may include a Teflon tape that is attached to the peripheral area 212. For example, the foreign substances may be filtered out by Teflon of the impact absorbing member 219.

Figure 6:
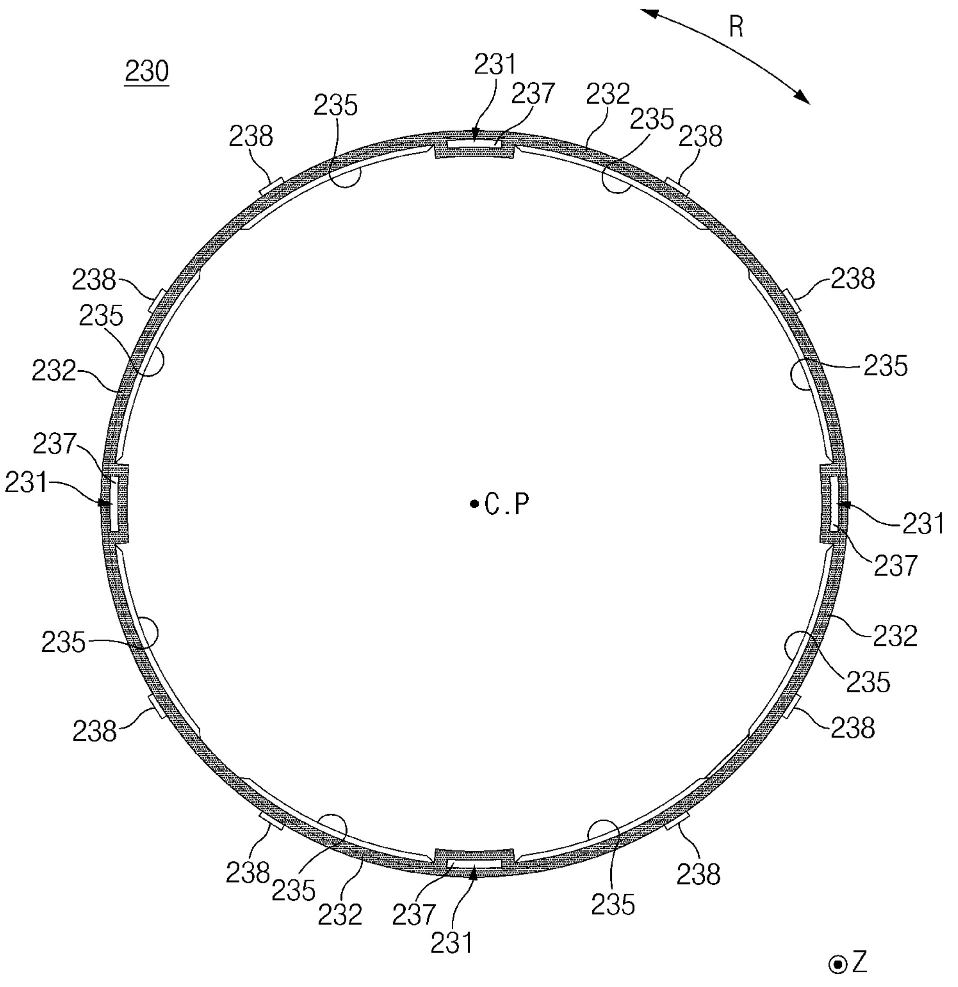
FIG. 6 is a view illustrating an example guide member of an example electronic device according to various embodiments.
Figure 7:
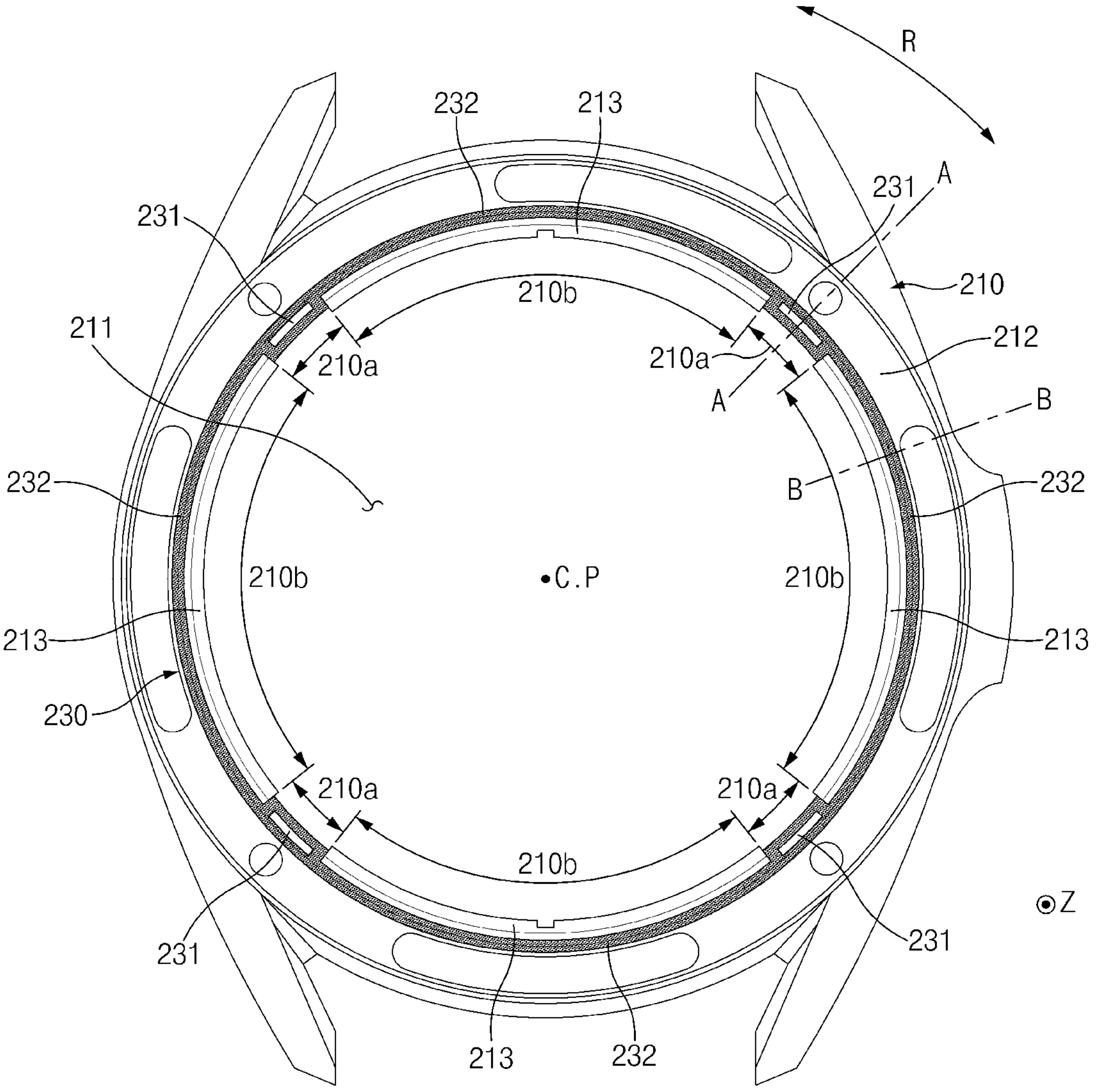
FIG. 7 is a view illustrating an example guide member and an example main body of an example electronic device according to various embodiments.

FIG. 6 is a view illustrating a guide member of the electronic device according to various embodiments. FIG. 7 is a view illustrating an example guide member and an example main body of an example electronic device according to various embodiments.

Hereinafter, a center of the guide member 230 having a ring shape and/or a center of the opening area 211 of the main body 210 will be defined as a center point. A center point C.P may be a point, through the rotation axis "C" of the wheel 250 illustrated in FIG. 4 passes. The inward direction may be defined, for example, as a direction that faces the center point C.P when viewed in the z axis direction, and the outward direction may be defined, for example, as a direction that becomes farther from the center point when viewed in the z axis direction. The circumferential direction "R" may be defined, for example, as a clockwise direction or a counterclockwise direction about the center point C.P. The circumferential direction may be referenced, for example, as a rotational direction of the wheel 250. The inward direction and the outward direction may be referenced, for example, as the radial direction.

In an embodiment, the guide member 230 may be formed in a ring shape. The guide member 230 may include the second part 232 that is coupled to the side wall 213 of the main body 210, and the first part 231 that is at least partially located in the space between the side walls 213. The first part 231 and the second part 232 may be formed along a circumferential direction of the guide member 230. In various embodiments, a plurality of first parts 231 and a plurality of second parts 232 may be formed. For example, when viewed in the circumferential direction, the first parts 231 may be formed at locations that are spaced apart from the other adjacent first parts 231 by a specific angle. The angle may be an angle that is measured with respect to the center point C.P. For example, the second parts 232 may be formed between the adjacent first parts 231. The second parts 232 may be formed by a specific length along the circumferential direction.

Referring to FIG. 7, in an embodiment, the main body 210 may include a fourth part 210*b*, in which the side walls 213 are formed, and a third part 210*a* that is coupled to the first part 231 of the guide member 230. For example, the fourth part 210*b* may include a part that is coupled to the second part 232 of the guide member 230. The third part 210*a* may include spaces between the side walls 213. At least portion of the first parts 231 of the guide member 230 may be located in the spaces of the third parts 210*a*.

In an embodiment, at least portions of the first parts 231 of the guide member 230 may be located in the spaces between the side walls 213. For example, each of the first parts 231 of the guide member 230 may include a part that extends further in an inward direction than the second part 232 of the guide member 230.

In an embodiment, the plurality of first parts 231 may be spaced apart from each other by substantially the same angle. For example, the first boss 237 for supporting the wheel 250 may be formed in each of the plurality of first parts 231. The first boss 237 may be provided to maintain a horizontal state of the wheel 250. Accordingly, the plurality of first parts 231 may be spaced apart from adjacent first parts 231 by substantially the same angle such that the wheel 250 is maintained in a horizontal state. For example, referring to the drawings, the guide member 230 may include four first parts 231, in which the bosses 237 are formed, and the first parts may be spaced apart from each other by an angle of 90 degrees. The number of first parts 231 is not limited to the illustration of the drawings, and the guide member 230 may include three or five or more first parts. Here, the maintenance of the horizontal state of the wheel 250 may refer to, for example, a phenomenon, in which a displacement in an opposite direction occurs in the left and right sides of the wheel 250 when the wheel 250 is viewed in a direction that is perpendicular to the rotation axis "C", may be restricted.

In an embodiment, the second part 232 may include a third protruding portion 235 that is inserted into a first recess (e.g., a first recess 215 of FIG. 9) of the main body 210. The third protruding portion 235 may fix the guide member 230 to the main body. The third protruding portion 235 may protrude toward an inward direction. For example, referring to FIGS. 6 and 7, the third protruding portion 235 may be covered by the side walls of the main body 210 when viewed in the z axis direction. For example, the third protruding portion 235 may at least partially contact the main body 210 to guide the guide member 230 such that the guide member 230 is prevented from being moved in the inward direction and the outward direction. For example, referring to FIG. 9, the third protruding portion 235 may contact at least one of a first inner wall 2151 and a second inner wall 2152 of the first recess 215.

Figure 9:
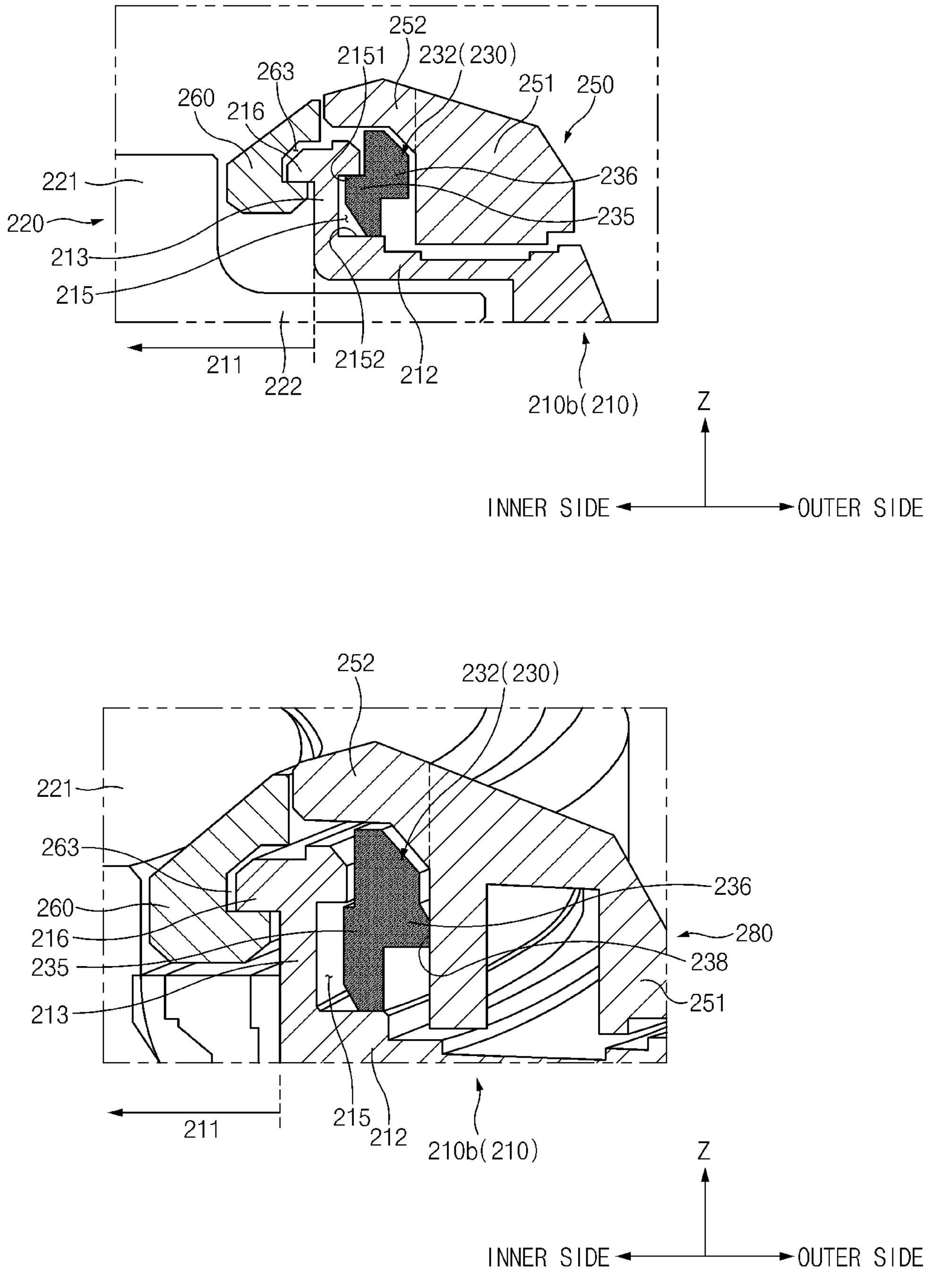
FIG. 9 is a cross-sectional view of the example electronic device according to various embodiments.

In an embodiment, a second boss 238 may be formed in the second part 232 of the guide member 230. The second bosses 238 may be arranged by a specific interval along the circumferential direction. For example, the second bosses 238 may be spaced apart from adjacent second bosses 238 by substantially the same angle. Referring to FIG. 9, the second bosses 238 may at least partially contact the wheel 250 to restrict the wheel 250 from being shaken in the inward direction or the outward direction.

Figure 8:
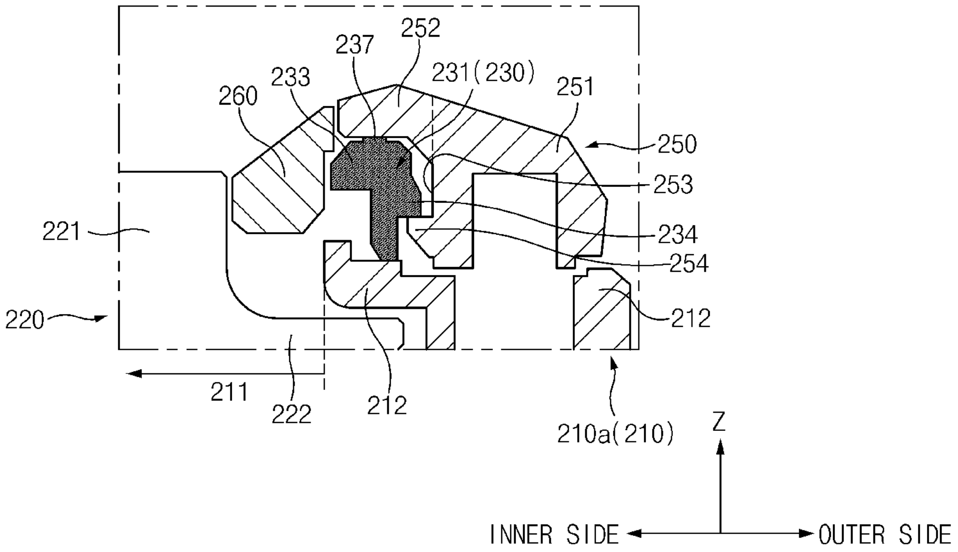
FIG. 8 is a cross-sectional view of the example electronic device according to various embodiments.
Figure 8:
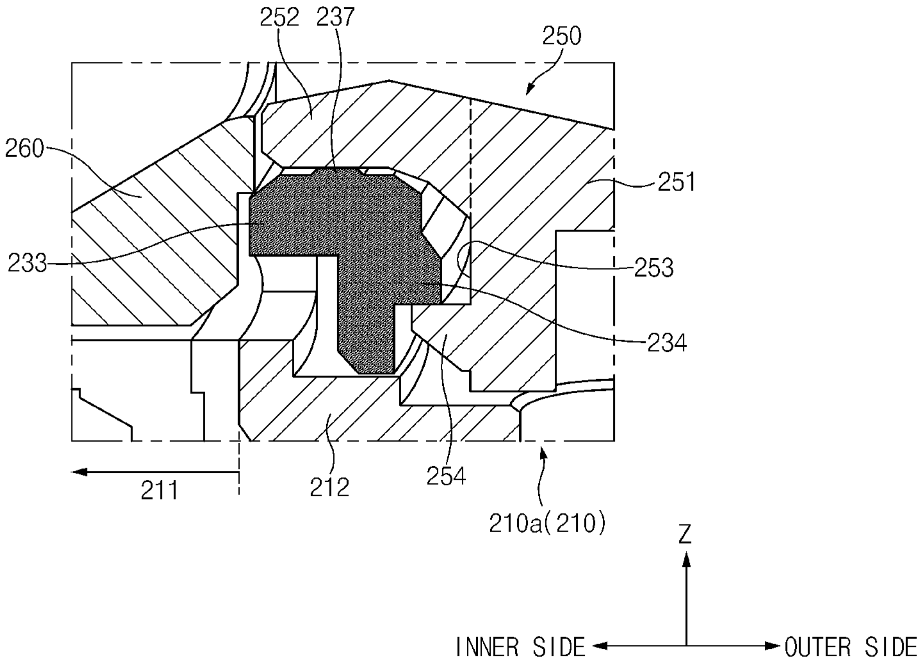

FIG. 8 is a cross-sectional view of the example electronic device according to various embodiments. FIG. 8 illustrates the first part of the guide member and the third part of the main body. For example, FIG. 8 is a cross-sectional view taken along A-A of FIG. 7.

FIG. 9 is a cross-sectional view of the example electronic device according to various embodiments. FIG. 9 illustrates the second part of the guide member and the fourth part of the main body. For example, FIG. 9 is a cross-sectional view taken along B-B of FIG. 7.

Referring to FIGS. 8 and 9, the main body 210 may include the opening area 211, and the peripheral area 212 that is a peripheral part of the opening area 211. At least a portion of the first area 221 of the front plate 220 may be located in the opening area 211. The opening area 211 may be at least partially surrounded by the side walls of the main body 210. The peripheral area 212 of the main body 210 may partially cover the second area 222 of the front plate 220.

In an embodiment, an inner ring 260 may be disposed in the opening area 211 of the main body 210. The inner ring 260 may be located between the first area 221 of the front plate 220 and the guide member 230. A second recess 263 that is recessed in the inward direction may be formed in the inner ring 260. A fifth protruding portion 216 that is formed in the side wall 213 of the main body 210 may be accommodated in the second recess 263.

In an embodiment, the side walls 213 may be formed in the peripheral area 212 of the main body 210. For example, the side walls 213 may extend from the peripheral area 212 in the z axis direction. Referring to FIG. 9, the side wall 213 may be formed in the fourth part 210*b* of the main body 210. For example, referring to FIG. 8, no side wall 213 may be formed in the third part 210*a* of the main body 210, or the third part 210*a* may be at least partially opened.

Referring to FIG. 9, the side wall 213 may include the fifth protruding portion 216 that extends in the inward direction. The fifth protruding portion 216 may be at least partially inserted into the second recess 263 that is formed in the inner ring 260. The first recess 215 may be formed in the side wall 213. The third protruding portion 235 formed in the second part 232 of the guide member 230 may be at least partially accommodated in an interior of the first recess 215. For example, the third protruding portion 235 may be located between the first inner wall 2151 and the second inner wall 2152 of the first recess 215 when viewed in the z axis direction.

In an embodiment, the wheel 250 may be coupled to the main body 210 to be rotatable through the guide member 230. For example, the front plate 220, the main body 210, the inner ring 260, and the guide member 230 may be fixed, and the wheel 250 may be rotated about the rotation axis "C".

Referring to FIGS. 8 and 9, the wheel 250 may include a seating part 251 that is seated in the peripheral area 212 of the main body 210, and an extending part 252 that extends from the seating part 251 in an inward direction. For example, the extending part 252 may extend to cover the guide member 230 and the side walls 213 of the main body 210 when viewed in the z axis direction. For example, the extending part 252 may extend to the inner ring.

Referring to FIG. 8, the wheel 250 may further include a step 254. The step 254 may extend from the seating part 251 in the inward direction to partially face the extending part 252 in the z axis direction. In an embodiment, the extending part 252 and the step 254 of the wheel 250 may extend from an inner side wall 253 of the seating part 251 of the wheel 250 in the inward direction. A second protruding portion 234 of the first part 231 of the guide member 230 may be located between the extending part 252 and the step 254 of the wheel 250.

Referring to FIGS. 8 and 9, the step 254 of the wheel 250 may be formed only at a location corresponding to the first part 231 of the guide member 230 and/or the third part 210*a* of the main body 210, or may not be formed at a location corresponding to the second part 232 of the guide member 230 and/or the fourth part 210*b* of the main body 210.

Referring to FIGS. 8 and 9, the extending part 252 of the wheel 250, the inner side wall 253 of the wheel 250, and the peripheral area 212 of the main body 210 may define a space that is opened in the inward direction. For example, referring to FIG. 8, the first part 231 of the guide member 230 may be located in the space. For example, referring to FIG. 9, the second part 232 of the guide member 230 and the side wall 213 of the main body 210 may be located in the space.

Referring to FIGS. 8 and 9, the guide member 230 may extend long in the z axis direction. For example, the guide member 230 may be located between the peripheral area 212 of the main body 210 and the extending part 252 of the wheel 250. For example, the guide member 230 may at least partially contact the peripheral area 212 and the extending part 252.

Referring to FIG. 8, the first part 231 of the guide member 230 may include a first protruding portion 233 that protrudes in the inward direction, and a second protruding portion 234 that protrudes in the outward direction. In an embodiment, the first protruding portion 233 may directly face or at least partially contact the inner ring 260. The first protruding portion 233, as illustrated in FIG. 8, may extend into a space between the adjacent side walls 213. In an embodiment, the second protruding portion 234 may extend into a space between the extending part 252 and the step 254 of the wheel 250. For example, the second protruding portion 234 may at least partially overlap the extending part 252 and the step 254 of the wheel 250 when viewed in the z axis direction. The second protruding portion 234 may contact the step 254 of the wheel 250 to restrict deviation of the wheel 250 in the z axis direction.

Referring to FIG. 9, the second part 232 of the guide member 230 may include a third protruding portion 235 that protrudes in the inward direction, and a fourth protruding portion 236 that protrudes in the outward direction. In an embodiment, the third protruding portion 235 may be at least partially accommodated in an interior of the first recess 215 formed in the side wall 213 of the main body 210. For example, the third protruding portion 235 may contact at least one of the first inner wall 2151 and the second inner wall 2152 of the first recess 215. In an embodiment, the fourth protruding portion 236 may extend into a space between the extending part 252 of the wheel 250 and the peripheral area 212 of the main body 210.

In an embodiment, the fourth protruding portion 236 may be formed not to collide the step 254 when the wheel 250 is rotated. For example, when viewed in the circumferential direction that is the rotational direction of the wheel 250, the fourth protruding portion 236 may be formed not to overlap the step 254. For example, when the wheel 250 is rotated by a first angle, the step 254 may partially contact the fourth protruding portion 236, and when the wheel 250 is rotated by a second angle, the step 254 may partially contact the second protruding portion 234. For example, the fourth protruding portion 236 may be formed not to overlap an area, through which the step 254 of the wheel 250 passes, when viewed in the rotational direction of the wheel 250. In various embodiments, the step 254 may contact the second protruding portion 234 in the direction (e.g., the z axis direction) of the rotation axis, and the step 254 may contact the fourth protruding portion 236 in the direction (e.g., the z axis direction) of the rotation axis.

In an embodiment, the guide member 230 may include a first boss 237 for supporting the wheel 250 in the z axis direction, and a second boss 238 for supporting the wheel 250 in a radial direction (e.g., the inward direction and the outward direction). For example, the first boss 237 may be provided to maintain a horizontal state of the wheel 250. For example, the second boss 238 may be provided to prevent the wheel 250 from being moved in a radial direction.

In various embodiments, the first boss 237 and the second boss 238 of the guide member 230 may be formed in at least one of the first part 231 and/or the second part 232.

Referring to FIG. 8, the first boss 237 of the guide member 230 may be formed in the first part 231 of the guide member 230. The first boss 237 of the guide member 230 may be configured to at least partially contact the extending part 252 of the wheel 250. As illustrated in FIGS. 6 and 7, a plurality of first parts 231 and a plurality of first bosses 237 of the guide member 230 may be provided to maintain the horizontal state of the wheel 250.

Referring to FIG. 9, the second boss 238 of the guide member 230 may be formed in the second part 232 of the guide member 230. The second part 232 of the guide member 230 may be configured to at least partially contact the inner side wall 253 of the seating part 251 of the wheel 250. As illustrated in FIGS. 6 and 7, the second boss 238 may be arranged while having a specific interval along a circumferential direction of the guide member 230. The second boss 238 may prevent the wheel 250 from being moved in the inward direction or the outward direction.

In an example embodiment, the inner ring 260 and the main body 210 may be coupled to each other through the guide member 230, and the wheel 250 may be coupled to the main body 210 to be rotatable. For example, the first protruding portion 233 of the first part 231 of the guide member 230 may be coupled to the inner ring 260. For example, the third protruding portion 235 of the second part 232 of the guide member 230 may be inserted into the first recess 215 of the main body 210 to couple the main body 210 and the guide member 230. For example, the second protruding portion 234 of the first part 231 of the guide member 230 and the fourth protruding portion 236 of the second part 232 may guide the rotational direction of the wheel 250. For example, the second protruding portion 234 may partially contact the step 254 to restrict movement of the wheel 250 in the z axis direction, and the first boss 237 and the fourth protruding portion 236 may partially contact the extending part 252 of the wheel 250 to restrict movement of the wheel 250 in the −z axis direction. For example, the second boss 238 of the guide member 230 may restrict movement of the wheel 250 in a direction (e.g., the inward direction and the outward direction) that is perpendicular to the rotation axis.

In an example embodiment, the first boss 237 and the second protruding portion 234 of the guide member 230 may contact the extending part 252 and the step 254 of the wheel 250, respectively, to prevent the left and right sides of the wheel 250 from being displaced in an opposite direction when the wheel 250 is viewed in a direction that is perpendicular to the rotation axis.

Figure 10:
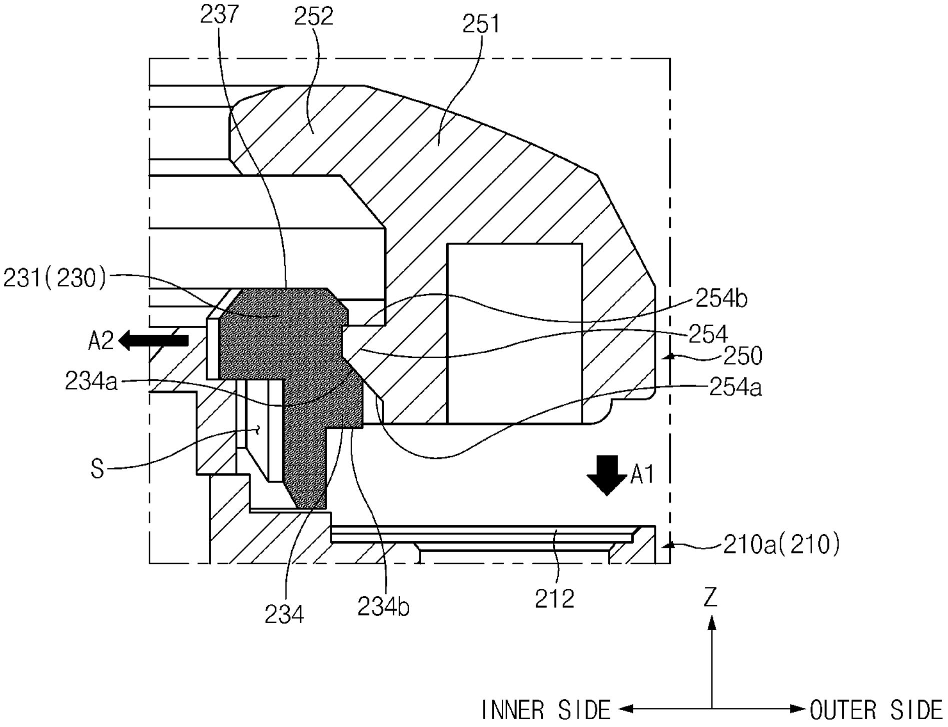
FIG. 10 is a view illustrating an example process of assembling the wheel of the example electronic device according to various embodiments.
Figure 10:
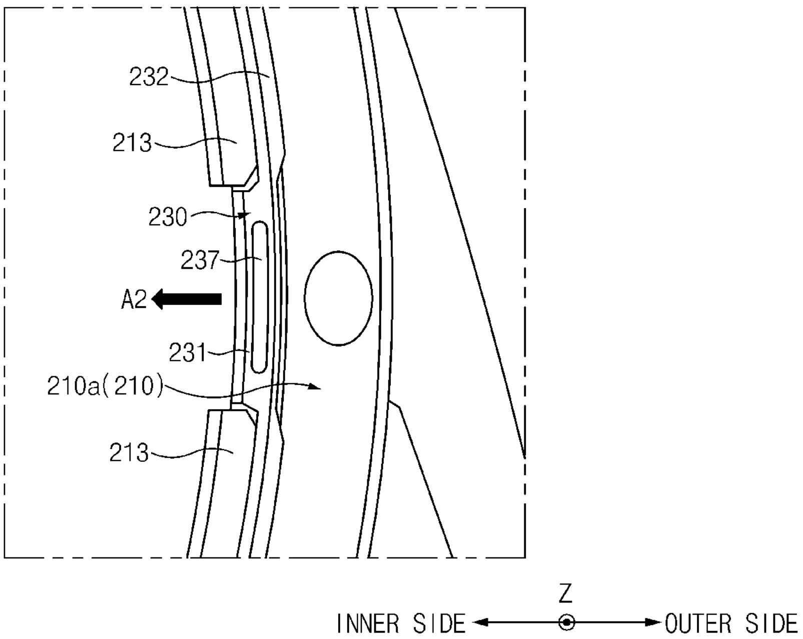

FIG. 10 is a view illustrating an example process of assembling an example wheel of an example electronic device according to various embodiments. FIG. 10 is a view illustrating the first part of the guide member, the third part of the main body, and a portion of the wheel coupled thereto.

Referring to FIG. 10, the wheel 250 may be assembled in the peripheral area 212 of the main body 210 in the −z axis direction (e.g., the direction of the rotation axis of the wheel 250). For example, the wheel 250 may be pressed in the −z axis direction (e.g., direction A1) such that the seating part 251 is seated in the peripheral area 212 of the main body 210.

In an embodiment, the step 254 of the wheel 250 may include a first inclined surface **254*a* corresponding to a second inclined surface 234*a* included in the second protruding portion 234 of the guide member 230. For example, the first inclined surface 254***a* may at least partially contact the second inclined surface 234*a*. For example, when the wheel 250 is assembled, the first inclined surface 254*a* may be moved along the second inclined surface 234*a*.

In an embodiment, the first inclined surface 254*a* may be formed to be inclined in the outward direction as it goes in an assembling direction (e.g., the −z axis direction) of the wheel 250. For example, when a height, by which the step 254 protrudes from the inner side wall of the seating part 251 of the wheel 250, is defined as a protrusion height, the protrusion height of the step 254 may be formed to become smaller as it goes in the −z axis direction. For example, as the wheel 250 is moved in the assembling direction, the first inclined surface 254*a* may press the second inclined surface 234*a* of the guide member 230 in the inward direction.

In an embodiment, the second inclined surface 234*a* may be formed to be inclined in the outward direction as it goes in the assembling direction (e.g., the −z axis direction) of the wheel 250. For example, an inclination angle of the second inclined surface 234*a* may be substantially the same as an inclination angle of the first inclined surface 254*a*.

In an embodiment, the guide member 230 may be configured to be moved in the inward direction (e.g., direction A2) when the wheel 250 is assembled. For example, the first part 231 of the guide member 230 may be coupled to the third part 210*a* of the main body 210. No side wall 213 may be provided in the third part 210*a* of the main body 210 or the third part 210*a* may be partially opened (S). Referring to the drawings, the first part 231 of the guide member 230 may not overlap the side wall 213 of the main body 210. Accordingly, when the wheel 250 is assembled in the main body 210 in the direction (e.g., direction A1) of the rotation axis of the wheel 250, the first part 231 of the guide member 230 may be pressed in the inward direction (e.g., direction A2) by the first inclined surface 254*a* of the wheel 250, and the guide member 230 may be moved in the inward direction (e.g., direction A2) by the pressing.

In an embodiment, the wheel 250 may be moved in the −z axis direction until the step 254 is located in the space between the peripheral area 212 of the main body 210 and the second protruding portion 234 of the guide member 230. As illustrated in FIG. 8, the assembling of the wheel 250 and the main body 210 may be finished when an upper surface 254*b* of the step 254 and a lower surface 234*b* of the second protruding portion 234 contact each other.

According to an example embodiment, a wearable electronic device 200 may include a main body 210 including a first surface having an opening area 211, wherein a plurality of side walls 213 surrounding at least a portion of the opening area 211 are formed in a peripheral area 212 of the opening area 211, a display 120 disposed in an interior of the main body 210 to be viewed through the opening area 211, a wheel 250 including a seating part 251 at least partially seated in the peripheral area, and an extending part 252 extending from the seating part in an inward direction, wherein the wheel 250 is formed in a ring shape extending in a circumferential direction defined with respect to a rotation axis of the wheel 250, and a guide member 230 at least partially contacting the main body 210 and the wheel 250 and that guides rotation of the wheel 250. The guide member 230 may include a first part 231, at least a portion of which extends in spaces between the plurality of side walls, and a second part 232 at least partially inserted into first recesses 215 formed in the plurality of side walls.

In various example embodiments, the seating part 251 of the wheel 250 may be located in outward directions of the side walls, and the extending part 252 of the wheel 250 may overlap the guide member and the side walls when viewed from the direction of the rotation axis.

In various embodiments, the first part 231 of the guide member 230 may include a first protruding portion 233 protruding in an inward direction and located in the spaces between the plurality of side walls 213, and a second protruding portion 234 protruding in an outward direction and at least partially contacting an inner wall of the seating part 251 of the wheel 250.

In various example embodiments, the second part 232 of the guide member 230 may include a third protruding portion 235 protruding in the inward direction and located in an interior of the first recess 215, and a fourth protruding portion 236 protruding in the outward direction and at least partially contacting an inner wall of the wheel 250.

In various example embodiments, the wheel 250 may further include a step 254 protruding from the seating part 251 toward the first part 231 of the guide member 230, the step 254 may at least partially face the extending part 252 in the direction of the rotation axis, and the second protruding portion 234 may be at least partially accommodated in the extending part 252 and the step 254.

In various example embodiments, the step 254 and the second protruding portion 234 may at least partially contact each other in a direction of the rotation axis, and the seating part 251 and the fourth protruding portion 236 may at least partially contact each other in a direction that is perpendicular to the rotation axis.

In various example embodiments, the step 254 may partially contact the second protruding portion 234 when the wheel 250 is rotated by a first angle, and may partially contact the fourth protruding portion 236 when the wheel 250 is rotated by a second angle.

In various example embodiments, a first inclined surface 254*a* may be formed in the step 254, and the first inclined surface 254*a* may be inclined such that a protruding height of the step 254 becomes smaller as it goes toward the peripheral area 212 of the main body 210.

In various example embodiments, a second inclined surface 234*a* may be formed at the second protruding portion 234, and the second inclined surface 234*a* may be inclined such that a protrusion height of the second protruding portion 234 becomes smaller as it becomes farther away from the peripheral area 212 of the main body 210.

In various example embodiments, the electronic device may further include a front plate 220, at least a portion of which is disposed in an interior of the main body 210, and an inner ring 260 disposed in the opening area 211, and at least a portion of which is disposed between the front plate 220 and the wheel 250 when viewed in a radial direction of the wheel 250.

In various example embodiments, an air gap may be formed between the first protruding portion 233 and the inner ring 260, and at least portions of the side walls 215 may be located between the third protruding portion 235 and the inner ring 260.

In various example embodiments, a first boss 237 at least partially contacting the extending part 252 of the wheel 250 may be formed in the first part 231 of the guide member 230.

In various example embodiments, a second boss 238 at least partially contacting the seating part 251 of the wheel 250 may be formed in the second part 232 of the guide member 230.

In various example embodiments, the first part 231 may include a plurality of first parts 231 spaced apart equally from each other along the circumferential direction.

In various example embodiments, a ball that may roll when the wheel 250 is rotated is provided in any one of the peripheral area 212 of the main body 210 and the seating part 251 of the wheel 250, and a recess, in which at least a portion of the ball is accommodated, may be formed in the other thereof.

According to an example embodiment, a wearable electronic device 200 may include a main body 210 including an opening area 211, and a first surface, on which a first side wall and a second side wall surrounding at least a portion of the opening area 211 are formed, a wheel 250 being rotatable about a rotation axis, wherein the wheel 250 includes a seating part 251 located on a radially outer side of the side wall and at least partially disposed on the first surface of the main body 210, and an extending part 252 extending from the seating part 251 on the radially inner side, and a guide member 230 including a first part 231, at least a portion of which is located in a space between the first side wall and the second side wall, and a second part located between the first side wall and the second side wall, and the seating part 251 of the wheel 250 when viewed in a radial direction. The first part 231 of the guide member 230 may include a first boss 237 protruding in the direction of the rotation axis to at least partially contact the extending part 252 of the wheel 250, and the second part 232 of the guide member 230 may include a second boss 238 protruding in the radial direction to at least partially contact the seating part 251 of the wheel 250.

In various example embodiments, the first part 231 of the guide member 230 may include a first protruding portion 233 protruding in a radially inward direction and located in spaces between the plurality of side walls 213, and a second protruding portion 234 protruding in a radially outward direction and at least partially contacting an inner wall of the seating part of the wheel 250, and the second part 232 of the guide member 230 may include a third protruding portion 235 protruding in the radially inward direction and located in an interior of the first recess 215, and a fourth protruding portion 236 protruding in the radially outward direction and at least partially contacting the inner wall of the seating part 251 of the wheel 250.

In various example embodiments, the wheel 250 may further include a step 254 protruding from the seating part 251 toward the first part 231 of the guide member, and the step 254 may at least partially face the extending part 252 in the direction of the rotation axis.

In various example embodiments, the step 254 of the wheel 250 and the second protruding portion 234 may at least partially contact each other in the direction of the rotation axis, and the seating part 251 of the wheel 250 and the fourth protruding portion 236 may at least partially contact each other in a direction that is perpendicular to the radial direction.

In various example embodiments, a first inclined surface 254*a* may be formed in the step 254, and the first inclined surface 254*a* may be inclined such that a protrusion height of the step 254 becomes smaller towards the first surface of the main body 210.

Figure 11:
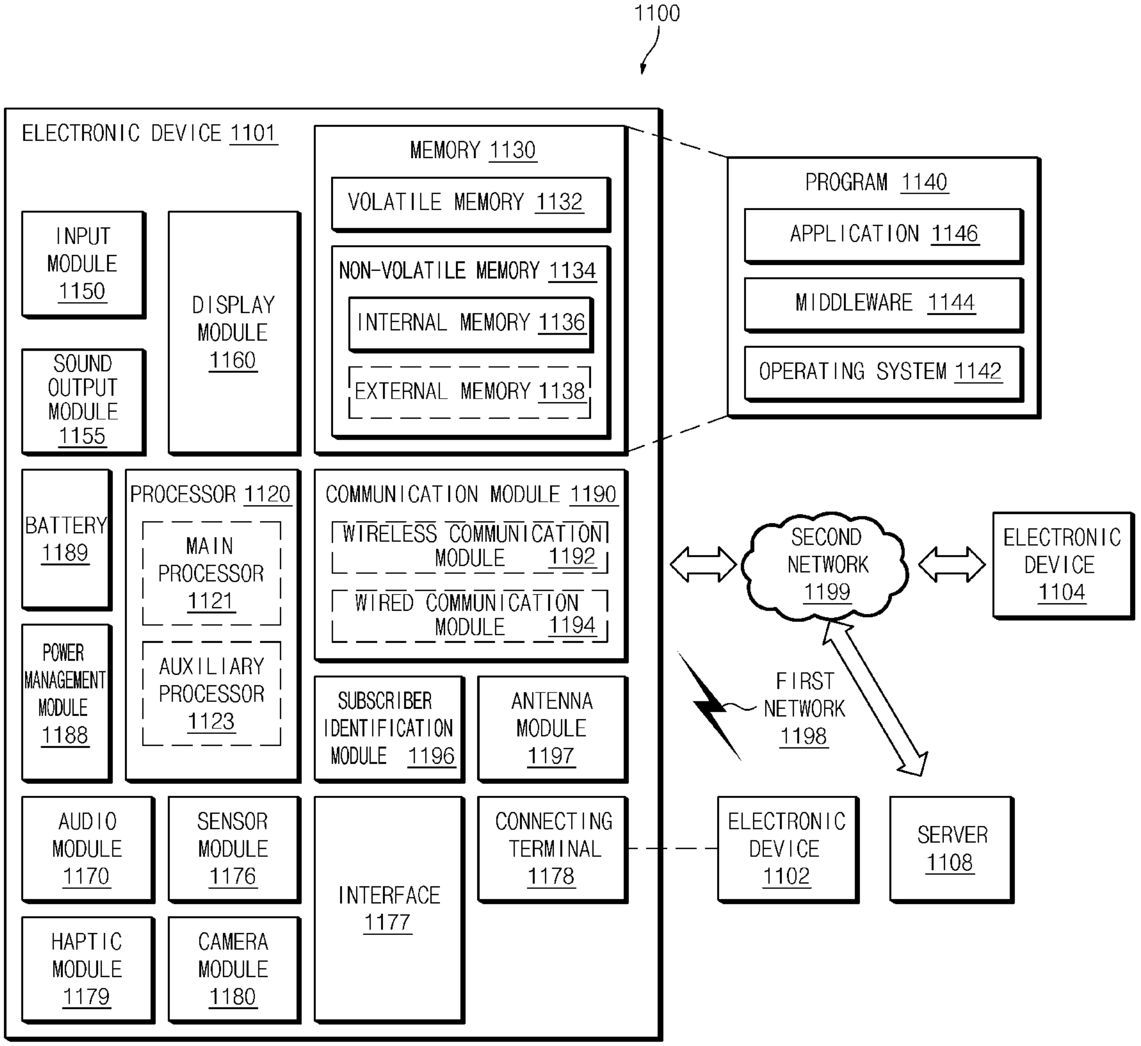
FIG. 11 is a block diagram illustrating an example electronic device in a network environment according to various embodiments.

FIG. 11 is a block diagram illustrating an example electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In various embodiments, at least one of the components (e.g., the connecting terminal 1178) may be omitted from the electronic device 1101, or one or more other components may be added in the electronic device 1101. In various embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of, the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 1164 dB or less) for implementing mMTC, or U-plane latency (e.g., 0.5 ms or less for each of downlink (DL) and uplink (UL), or a round trip of 11 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of or including a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function or operation according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being is a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:

a main body including a first surface having an opening area, wherein a plurality of side walls surrounding at least a portion of the opening area are formed in a peripheral area of the opening area and each of the plurality of side walls includes a first recess respectively;

a display disposed in an interior of the main body and viewable through the opening area;

a wheel including a seating part at least partially seated in the peripheral area, and an extending part extending from the seating part in an inward direction, wherein the wheel is formed in a ring shape extending in a circumferential direction defined with respect to a rotation axis of the wheel; and a guide member at least partially contacting the main body and the wheel and configured to guide rotation of the wheel, wherein the guide member includes:

a first part, at least a portion of which extends in spaces between the plurality of side walls, and a second part at least partially inserted into each of the first recess.

2. The wearable electronic device of claim 1, wherein the seating part of the wheel is located in outward directions of the side walls, and wherein the extending part of the wheel overlaps the guide member and the side walls when viewed from a direction of the rotation axis.

3. The wearable electronic device of claim 1, wherein the first part of the guide member includes a first protruding portion protruding in an inward direction and located in the spaces between the plurality of side walls, and a second protruding portion protruding in an outward direction and at least partially contacting an inner wall of the seating part.

4. The wearable electronic device of claim 3, wherein the second part of the guide member includes a third protruding portion protruding in the inward direction and located in an interior of the first recess, and a fourth protruding portion protruding in the outward direction and at least partially contacting an inner wall of the wheel.

5. The wearable electronic device of claim 4, wherein the wheel further includes a step protruding from the seating part toward the first part of the guide member, wherein the step at least partially faces the extending part in a direction of the rotation axis, and wherein the second protruding portion is at least partially accommodated in a space between the extending part and the step.

6. The wearable electronic device of claim 5, wherein the step and the second protruding portion at least partially contact each other in the direction of the rotation axis, and wherein the seating part and the fourth protruding portion at least partially contact each other in a direction that is perpendicular to the rotation axis.

7. The wearable electronic device of claim 5, wherein the step partially contacts the second protruding portion when the wheel is rotated by a first angle, and partially contacts the fourth protruding portion when the wheel is rotated by a second angle.

8. The wearable electronic device of claim 5, wherein a first inclined surface is formed in the step, and wherein the first inclined surface is inclined such that a protruding height of the step becomes smaller towards the peripheral area of the main body.

9. The wearable electronic device of claim 8, wherein a second inclined surface is formed at the second protruding portion, and wherein the second inclined surface is inclined such that a protrusion height of the second protruding portion becomes smaller away from the peripheral area of the main body.

10. The wearable electronic device of claim 4, further comprising:

a front plate, at least a portion of which is disposed in an interior of the main body; and an inner ring disposed in the opening area, at least a portion of which is disposed between the front plate and the wheel when viewed in a radial direction of the wheel.

11. The wearable electronic device of claim 10, wherein an air gap is formed between the first protruding portion and the inner ring, and wherein at least portions of the side walls are located between the third protruding portion and the inner ring.

12. The wearable electronic device of claim 1, further comprising a first boss at least partially contacting the extending part of the wheel and which is formed in the first part of the guide member.

13. The wearable electronic device of claim 1, further comprising a first boss at least partially contacting the seating part of the wheel and which is formed in the second part of the guide member.

14. The wearable electronic device of claim 1, wherein the first part includes a plurality of first parts substantially equally spaced apart from each other along the circumferential direction.

15. The wearable electronic device of claim 1, further comprising a ball configured to roll when the wheel is rotated and which is disposed in any one of the peripheral area of the main body and the seating part of the wheel, and a second recess, in which at least a portion of the ball is accommodated, which is formed in the other thereof.

16. A wearable electronic device comprising:

a main body including an opening area, and a first surface, on which a first side wall and a second side wall surrounding at least a portion of the opening area are formed;

a wheel rotatable about a rotation axis, wherein the wheel includes a seating part located on a radially outer side of the first side wall and at least partially disposed on the first surface of the main body, and an extending part extending from the seating part on the radially outer side; and a guide member including a first part, at least a portion of which is disposed in a space between the first side wall and the second side wall, and a second part disposed between each of the first side wall and the second side wall, and the seating part of the wheel when viewed in a radial direction, wherein the first part of the guide member includes a first boss protruding in a direction of the rotation axis to at least partially contact the extending part, and wherein the second part of the guide member includes a second boss protruding in the radial direction to at least partially contact the seating part of the wheel.

17. The wearable electronic device of claim 16, wherein the first part of the guide member includes a first protruding portion protruding in a radially inward direction and located in spaces between the first side wall and the second side wall, and a second protruding portion protruding in a radially outward direction and at least partially contacting an inner wall of the seating part of the wheel, and wherein the second part of the guide member includes a third protruding portion protruding in the radially inward direction and disposed in an interior of a first recess, and a fourth protruding portion protruding in the radially outward direction and at least partially contacting the inner wall of the seating part of the wheel.

18. The wearable electronic device of claim 17, wherein the wheel further includes a step protruding from the seating part toward the first part of the guide member, and wherein the step at least partially faces the extending part in the direction of the rotation axis.

19. The wearable electronic device of claim 18, wherein the step of the wheel and the second protruding portion at least partially contact each other in the direction of the rotation axis, and wherein the seating part of the wheel and the fourth protruding portion at least partially contact each other in a direction that is perpendicular to the radial direction.

20. The wearable electronic device of claim 18, wherein a first inclined surface is formed in the step, and wherein the first inclined surface is inclined such that a protrusion height of the step becomes smaller towards the first surface of the main body.

* * * * *